United States Patent [19]

Neugebauer

[11] 3,763,959
[45] Oct. 9, 1973

[54] HYDROSTATIC LUBRICATING DEVICE FOR THE MESHING POINTS OF CYLINDER WORMS AND A WORM RACK

[75] Inventor: Heinz Neugebauer, Weidach near Coburg, Germany

[73] Assignee: Werkzeugmaschinenfabrik Adolf Waldrich Coburg, Hahnweg, Germany

[22] Filed: Dec. 20, 1971

[21] Appl. No.: 209,679

[30] Foreign Application Priority Data
Dec. 23, 1970 Germany .................. P 20 63 344.7

[52] U.S. Cl. .................... 184/6.12, 74/409, 74/468
[51] Int. Cl. ............................................ F16h 1/20
[58] Field of Search .................... 184/6.12; 74/409, 74/410, 426.6, 426.8 A, 467, 468, 441

[56] References Cited
UNITED STATES PATENTS 3,448,631   6/1969   Sullivan ........................ 74/468 X
3,454,136   7/1969   Stark ............................ 184/6.12
3,595,100   7/1971   Stark et al. ......................... 74/409
3,448,632   6/1969   Rumbarger ...................... 74/468 X
3,415,138   12/1968  Rumbarger et al. ............. 74/468 X
3,651,706   3/1972   Galbarini ........................ 74/467 X
3,516,298   6/1970   Arndt ............................. 74/468 X

*Primary Examiner*—Manuel A. Antonakas
*Attorney*—Woodhams, Blanchard & Flynn

[57] ABSTRACT

A hydrostatic lubricating device for the points of engagement between the cylinder worms and a worm rack. Lubricating oil is supplied through oil bores under pressure by means of a distributor device. The oil bores are either distributed uniformly on the periphery of the tooth flanks of the worms or provided in the tooth flanks of the rack so that only the meshing points of the tooth flanks are supplied with lubricating oil.

6 Claims, 6 Drawing Figures

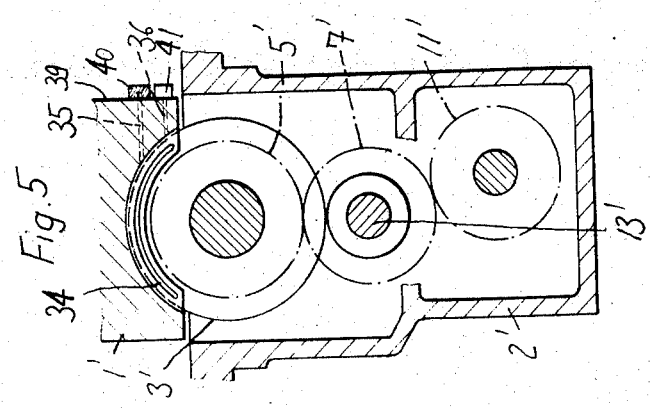
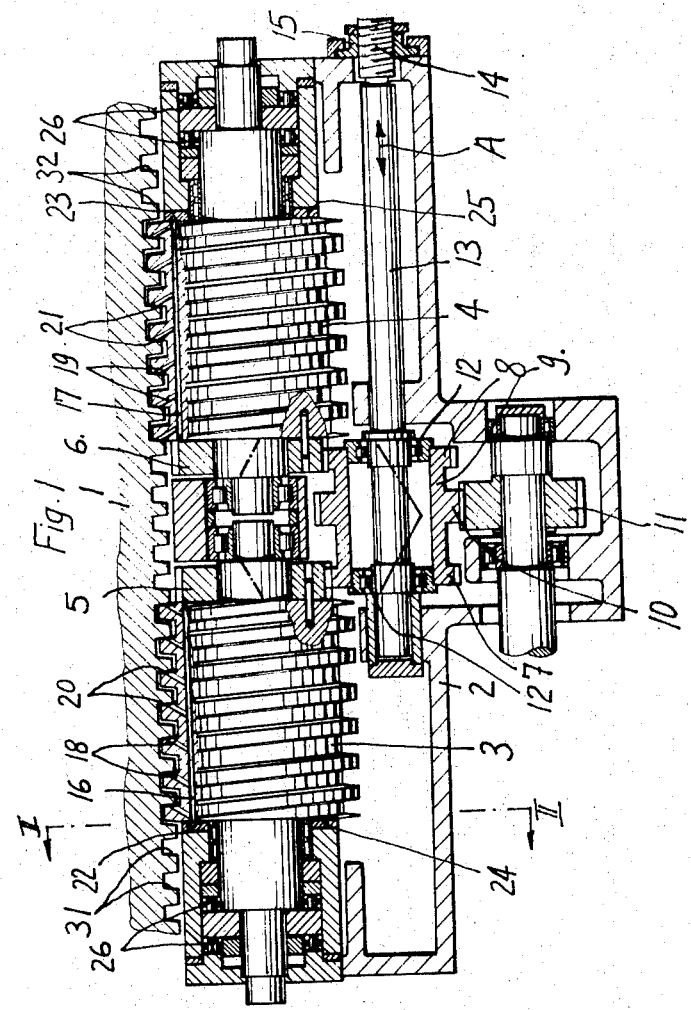

INVENTOR
HEINZ NEUGEBAUER

HYDROSTATIC LUBRICATING DEVICE FOR THE MESHING POINTS OF CYLINDER WORMS AND A WORM RACK

The invention relates to a hydrostatic lubricating device for the meshing points of cylinder worms and of a worm track, in which lubricating oil is supplied under pressure by means of a distributor device to the meshing points through lubricating oil bores either distributed uniformly on the periphery of the tooth flanks of the worms or provided in the tooth flanks of the rack, such that only the meshing ports of the tooth flanks are supplied with lubricating oil.

Widely differing hydrostatic lubricating devices for the meshing points of cylinder worms and a worm rack are known. In such lubricating devices, the lubricating gap width is always problematic. If this is too large, it requires increased pump power of the pumps provided for hydrostatic lubrication. If the lubricating gap width is too small, there is a risk that the cooperating tooth flanks will come into contact with each other, so that undesirably high friction or even scuffing occurs. In the hitherto known hydrostatic lubricating devices for the meshing points of cylinder worms and a worm rack, the lubricating gap width is not adjustable. While retaining very close production tolerances, it would be possible in certain cases to machine worm and rack such that the predetermined play and hence desired lubricating gap width would be provided between the tooth flanks of the worm and of the worm rack. This, however, would result in very high production costs. If, in such a case, any production fault were to occur or, despite exact machining, unpredictable scuffing occurred between worm and worm rack, all the parts would have to be re-made. Re-machining for example of the tooth flanks of the worm rack is impossible since that would increase the size of the lubricating gap width and hence an increase in pump power would be necessary so that the pump in use would have to be replaced by a new pump of higher power.

Substantially, two different systems are so far known for supplying lubricating oil to the meshing points of cylindrical worms and a worm rack; firstly the supply of lubricating oil by way of the worm and secondly, the supply of lubricating oil by way of the worm rack.

Thus a hydrostatic lubricating device is known (from British Patent Specification 1,111,685), in which the tooth flanks of the worm have lubricating oil bores distributed uniformly on the periphery. These lubricating oil bores are in communication with a number of axially parallel distributor ducts in the worm hub. A first group of distributor ducts is in this case connected to the lubricating oil ducts opening into tooth flanks of the worm, while a second group is connected to the lubricating oil ducts opening on the oppositely directed tooth flanks. Each group of distributor ducts is supplied separately with lubricating oil by separate supply conduits in the worm shaft. A distributor plate at each end of the worm shaft bears against the latter and is provided with a distributor groove extending only over a fraction of its periphery. The distributor groove lies inside the angle which includes the worm rack with respect to the worm axis. This ensures that lubricating oil under pressure only reaches those lubricating oil ducts which are situated within the worm rack.

In a somewhat modified type (known from German Laid-Open Specification 1,273,289), for the same purpose, the worm hub is mounted on a stationary axle having on its periphery distributor grooves which also extend over part of the periphery. Here also oppositely directed tooth flanks are supplied separately with lubricating oil.

In another hydrostatic lubricating device (known from U.S. Pat. No. 3,415,138), the lubricating oil supply takes place through the worm rack. For this purpose, the latter has lubricating oil grooves terminating in its tooth flanks. Supply of lubricant takes place by means of lubricating oil bores opening at one end in the lubricating oil grooves and at the other end on the lateral surface of the worm rack. The orifices in the lateral surface are arranged in two parallel rows, each row of orifices being associated with a tooth flank side. In the range of the worm there are provided distributor strips which cover a row of orifices in each case. By menas of these distributor strips, which are pressed against the lateral surfaces of the rack, the lubricating oil is transferred from the stationary part of the machine to the movable rack. Whereas in this known type, the rows of lubricating oil bore orifices are provided on two oppositely located lateral surfaces of the rack, according to another type (known from U.S. Pat. No. 3,323,385), the lubricating oil bore orifices are provided also in two rows arranged one above the other on a lateral surface of the worm rack.

The invention is based on the problem of providing a hydrostatic lubricating device for the meshing points of cylindrical worms and a worm rack of the aforesaid types, in which an adjustment of the lubricating gap width is possible in a simple manner at any time without dismounting any part.

For this purpose, the invention is characterised by:

a. two coaxially arranged individual mounted worms, which are driven by two gearwheels, rigidly connected together and provided with helical teeth having angles of slope equal in magnitude but opposite in direction;

b. an adjusting device for the joint axial displacement and fixing of both gearwheels;

c. lubricating oil bores and distributor devices, which in the range of the first worm supply lubricating oil under pressure only to the tooth flanks facing in one direction, while in the range of the second worm lubricating oil is supplied to the tooth flanks facing in the opposite direction.

By axially shifting the two gearwheels, the helical teeth produce reciprocal rotation of the worms in opposite directions. Owing to this reciprocal rotation, the tooth flanks of each worm are moved closer to or further away from the tooth flanks of the worm rack. Since, in addition, each worm acts drivingly only in one direction, exact adjustment of the lubricating gap width is possible at any time. The pump power for the hydrostatic lubricating device can thus be calculated exactly beforehand. In addition, in the production of worm and worm rack, much larger tolerances with respect to tooth thickness can be permitted and hence production costs can be saved. In addition, in the case of breakdown, it is possible at any time, to remachine the screwthread flanks of the worm rack, since the lubricating gap width can be re-adjusted to the desired amount. It is not necessary, for this purpose, to dismount any part, since an externally operatable adjusting device is provided.

The invention is explained more fully in the following with reference to the embodiment examples illustrated in the drawings, in which:

FIG. 1 shows a longitudinal section through a first embodiment example,

FIG. 5 shows a cross section on the line V—V of FIG. 4.

Figure 3:
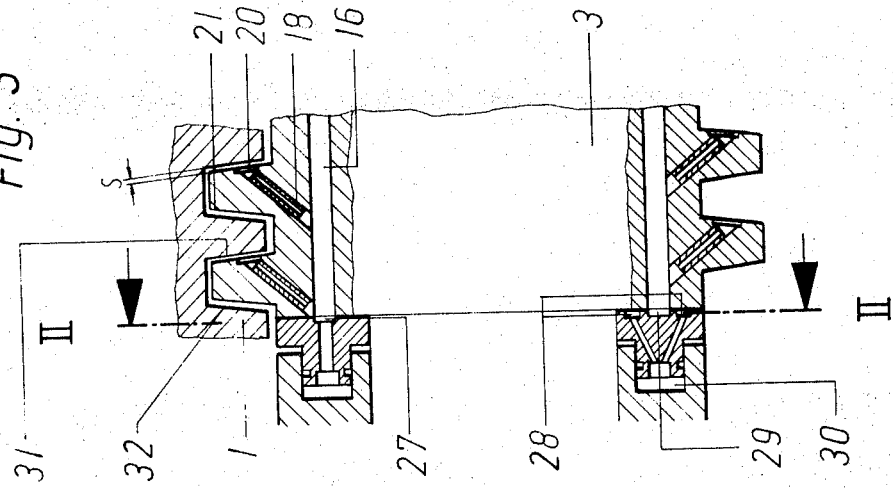
FIG. 3 shows a part longitudinal section on the line III—III of FIG. 2 on a larger scale.

In the drawings, 1 denotes a worm rack which, for example, can be connected to the reciprocatable workpiece mounting table of a milling machine. A gearbox 2 is mounted in the bed of this milling machine. Two worms 3 and 4 are rotatably mounted in the said gearbox. Each of the worms 3 and 4 is connected to a helically-toothed gearwheel 5 and 6. These gearwheels 5 and 6 mesh with other helically-toothed gearwheels 7 and 8. As may be gathered from the drawing, the gearwheels 7 and 8 and accordingly also the gearwheels 5 and 6 have on their teeth equal but oppositely directed angles of slope. The two gearwheels 7 and 8 are connected together nonrotatably and mutually axially nondisplaceably. A further gearwheel 10, mounted on the said hollow shaft 9, meshes with the driving gearwheel 11. The hollow shaft 9 is mounted rotatably on the axle 13 by means of the bearings 12. The said axle is slidable in the gearbox 2 in the direction A. For this purpose it has on its end a screwthread 14, which co-operates with nut 15 rotatably but axially indisplaceably mounted in the gearbox 2. By rotation of the nut 15, the axle 13 and with it also the two gearwheels 7, 8 can be shifted together in the axial direction A. The opposite set of helical teeth cause the worms 3, 4 to rotate in opposite directions of rotation by a certain angular amount.

Figure 2:
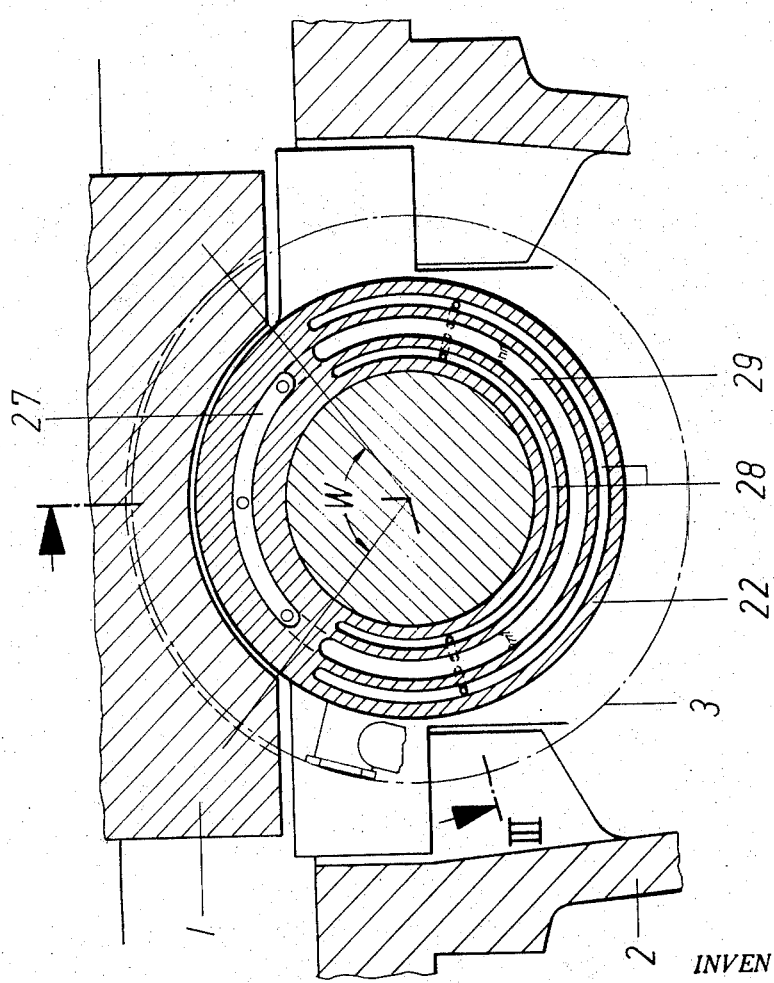
FIG. 2 shows a cross section along the line II—II of FIG. 1 or 3.

In the embodiment example illustrated in FIGS. 1 to 3, the supply of lubricating oil is effected in that axially parallel distributor ducts 16, 17 are provided in the worms. The distributor ducts are connected to lubricating oil bores 18 and 19, respectively, which open on the tooth flanks 20 and 21, respectively. As may be gathered from FIG. 1, in the case of the first worm 3, the lubricating oil bores 18 open always only on the right-hand flank 20, while in the case of the second worm 4, the lubricating oil bores 19 open on the left-hand flanks 19 facing the other direction.

The lubricating oil supply to the distributor ducts 16, 17 takes place by means of a respective distributor ring 22, 23. Each of the two distributor rings 22, 23 is provided on the end faces 24 and 25 of the respective worms 3 and 4, the said end faces facing away from the orifices of the respective lubricating oil bores 18 and 19 and being offset relative to the worm shaft. On the same side as the distributor ring 22, 23, there is also provided in the case of each worm 3, 4 at least one axial bearing 26. In the embodiment example shown, two such axial bearings are provided in each case. Owing to the arrangement of the distributor rings 22, 23 on the same side as the axial bearings 26, the latter are partly relieved of load by the lubricating oil pressure acting on the end faces 24, 25. This is to be regarded as a special advantage because narrow limits are set to the load-carrying capacity of the main axial bearings constructionally in this case of application in view of the fixing of a definite maximum outer diameter - slightly less than the worm thread root diameter. The solution according to the invention obviates the use of expensive hydrostatic axial bearings.

As may be gathered from FIG. 2, the distributor ring 22 has a distributor groove 27 extending over part of the periphery. The ends of the distributor groove in the peripheral direction are arranged such that they lie within the angle W which the tooth flanks of the worm rack make with the worm axis. This ensures that lubricating oil under pressure always reaches only those distributor ducts 16 which are connected to lubricating oil bores 18 whose orifices are directly covered by the tooth flanks of the worm rack. It will here be mentioned merely for the sake of completing the description that for providing a uniform support of the distributor ring 22, the latter may be equipped with further annular grooves 28 and 29, which are provided on the distributor ring outside the angle W. Lubricating oil, which is supplied to the distributor ring 27 by way of a common annular duct 30, enters the grooves 28 and thus presses on the end face 24 of the worm 3. Part of the lubricating oil passes through the gap formed between the distributor ring 22 and the end face 24 and also enters the annular groove 29 and proceeds from the latter into the distributor ducts 16, thereby ensuring that the distributor ducts 16 and the lubricating oil bores 18, which outside the region of the angle W are not covered by the tooth flanks of the worm, remain filled with lubricating oil. The foregoing statements also apply correspondingly to the distributor ring 23 of the worm 4.

As has already been mentioned, only one worm acts drivingly in each driving direction, while the other worm exercises a certain counterholding effect, which is important in the case of different loads. Thus, for example, in a movement of the worm rack 1 to the left, the worm 3 acts drivingly. In the opposite direction, the worm 4 drives. It is therefore always merely a matter of the driving tooth flanks or the tooth flanks of worms 3, 4 exercising a counterholding effect being brought into the correct distance relative to the oppositely situated tooth flanks of the worm rack. This distance, which is also termed the gap width S, is shown in FIG. 3. The gap width S between the tooth flank 20 of the worm 3 and the tooth flank 31 of the worm rack is varied by the relative rotation of the two worms 3, 4, this relative rotation being produced by the adjusting device described in the foregoing. Simultaneously with a variation in the gap width between the tooth flanks 20, 31, the gap width between the oppositely directed flanks 21 of the worm 4 and 32 of the worm rack 1 is also varied.

Figure 4:
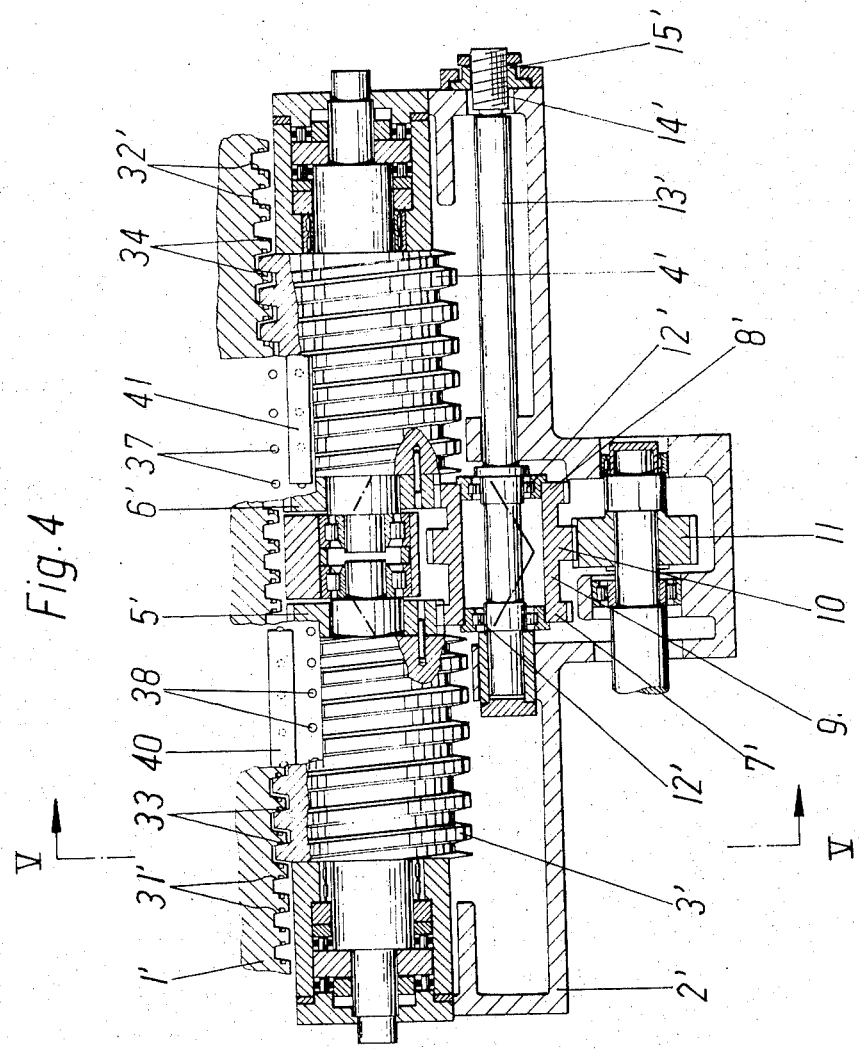
FIG. 4 shows a second embodiment example in longitudinal section.
Figure 6:
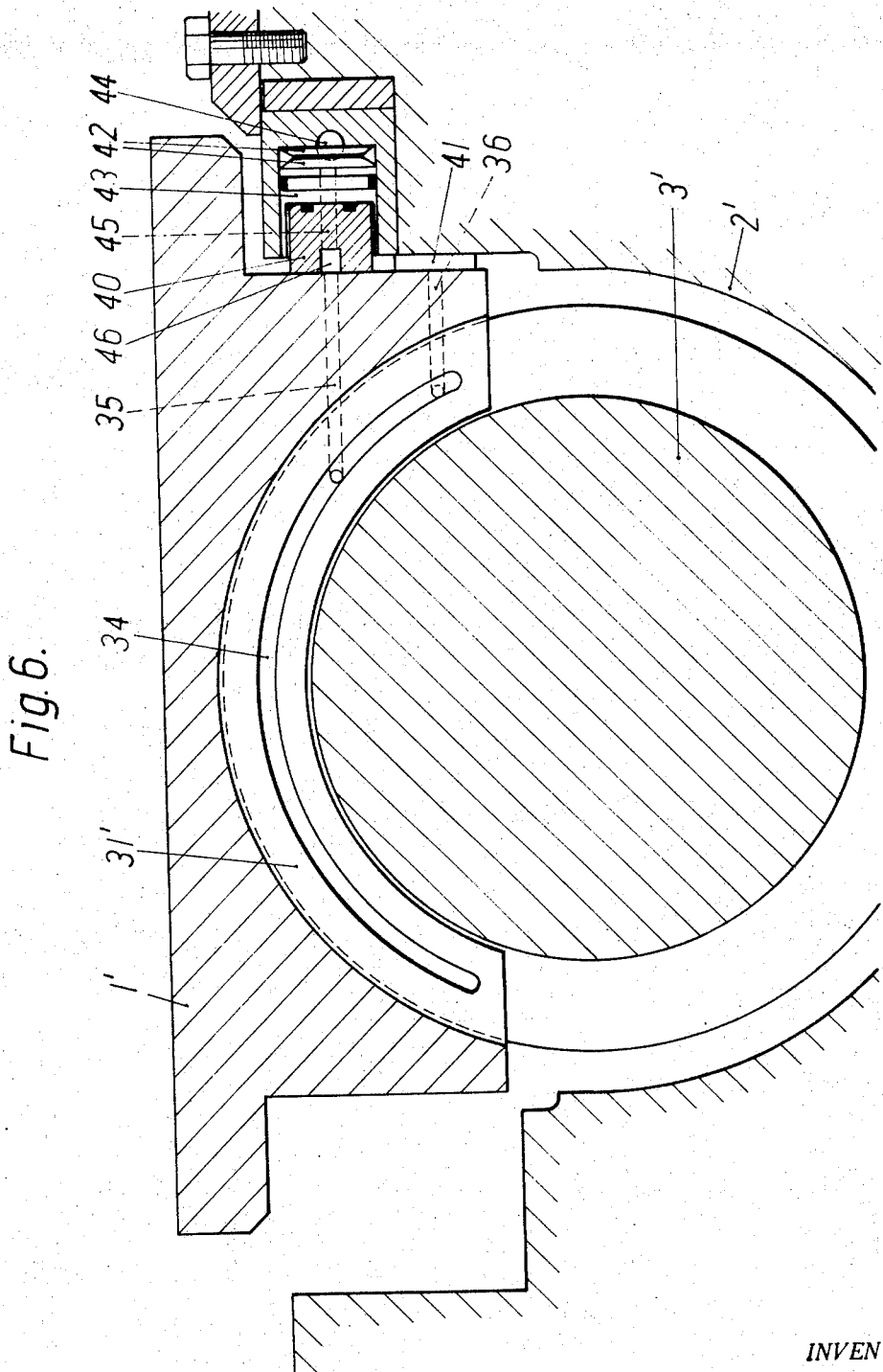
FIG. 6 shows a part cross section also on the line V—V of FIG. 4 on a larger scale.

The embodiment example shown in FIGS. 4 to 6 differs from the embodiment example described in the foregoing merely by the method of lubricant supply, which here takes place by means of the worm rack. Parts having the same function are in each case provided with an index stroke, the foregoing description concerning the drive and mutual adjustment of the two worms 3, 4' being correspondingly applicable.

As may be gathered from FIGS. 4 and 6, the tooth flanks 31', 32' of the worm rack 1' have limited lubricating oil grooves 33, 34. These grooves 33, 34 are supplied with lubricating oil through lubricating oil bores 35 and 36. The lubricating oil bores 35, 36 open into two rows of orifices 37, 38, which rows are arranged one above the other and parallel to one another, on a lateral face 39 of the worm rack 1'. A distributor strip 40 is provided in the range of the worm 3' and covers some of the orifices 37. A second distributor strip 41 is arranged in the range of the worm 4' and covers the orifices 38. As may be seen in FIG. 6, the distributor strips are pressed against the lateral face 39 by dish springs 42 and piston 43. The lubricating oil, passing through a duct 44 and a bore 45 in the piston 43, arrives under pressure in the distributor duct 46 of the distributor strip 40. The length of the distributor duct 46 corresponds substantially to the length of the worm 3'. In this way, during displacement of the worm rack, only those lubricating bores 35 are filled with lubricating oil which are in communication with distributor grooves 33 just covered by the tooth flanks. The same also applies correspondingly for the distributor strip 41 in the range of the worm 4'.

The present invention is not restricted to the embodiment examples shown. Thus, for example, the lubricating oil could be supplied to a worm provided with lubricating bores also through a stationary worm shaft, as mentioned at the outset. For the axial adjustment of the helically toothed gearwheels driving the worms, a differently constructed adjusting device may also be provided. For example, it would be possible to mount the gearwheels not on a hollow shaft but on a solid one and to mount this shaft slidably in the gearbox.

The embodiments of the invention in which an exclusive property or privilege is claimed are defined as follows:

I claim:

1. Hydrostatic lubricating device for the meshing points of cylinder worms and of a worm rack, in which lubricating oil is supplied under pressure by means of a distributor device to the meshing points through one of lubricating oil bores distributed uniformly on the periphery of the tooth flanks of the worms and lubricating oil bores in the tooth flanks of the rack, such that only the meshing parts of the tooth flanks are supplied with lubricating oil, comprising:
   a. first and second coaxially arranged individually mounted worms, which are driven by two axially shiftable gearwheels rigidly connected together and provided with helical teeth having angles of slope equal in magnitude but opposite in direction;
   b. adjusting means for adjusting the axial displacement and position of said gearwheels; and
   c. lubricating oil bores and distributor means for distributing oil to said lubricating oil bores, said distributor means in the range of said first worm, supplying lubricating oil under pressure only to the tooth flanks facing in one direction, while in the range of said second worm supplying lubricating oil to the flanks facing in the opposite direction.

2. Device according to claim 1, wherein each worm has a number of axially parallel distributor ducts connected to said lubricating oil bores opening on the tooth flanks, and wherein said lubricating oil bores of the first worm open only to the tooth flanks facing in the one direction, while the second worm is provided with lubricating oil bores which open only in the oppositely directed tooth flanks.

3. Device according to claim 2, wherein said distributor means is located on the end face of each worm which is turned away from the orifices of the lubricating bores and is offset relative to the worm shaft, said distributor means comprising a distributor ring and at least one axial bearing, said distributor ring having a distributor groove which is open towards the end side of the worm and which, in the peripheral direction, is so long that always only those distributor ducts can be fed which are in communication with those orifices of the lubricating oil bores which are situated within the worm rack.

4. Device according to claim 1, wherein the tooth flanks of the worm racks have limited lubricating oil grooves which are connected by means of lubricating oil bores to orifices arranged in two parallel rows, associated with differently directed tooth flanks, and situated in at least one lateral face of the rack, and, wherein, in the range of the first worm, a distributor strip is provided for bearing against the lateral face of the rack and having a distributor duct covering one row of orifices, while in the range of the second worm a second distributor strip bears against the lateral face of said rack and covers the other row of orifices by means of its distributor duct.

5. Device according to claim 1, wherein said gearwheels are mounted rotatably and axially immovably on an axle axially slidable and fixable in said gearbox.

6. Device according to claim 1, wherein said adjustment means comprises a screwthread on an axially shiftable axle having said gearwheels mounted thereon which co-operates with a nut rotatably and axially indisplaceably mounted in said gearbox.

* * * * *